United States Patent [19]

Harvey, Jr.

[11] 4,236,282

[45] Dec. 2, 1980

[54] HELICAL COIL ROPE FASTENING DEVICE

[76] Inventor: Howard F. Harvey, Jr., 416 Third Ave., W., Hendersonville, N.C. 28739

[21] Appl. No.: 907,329

[22] Filed: May 18, 1978

[51] Int. Cl.³ .............................................. F16G 11/00
[52] U.S. Cl. ................................................... 24/131 C
[58] Field of Search .......................... 24/131 C, 131 R

[56] References Cited

U.S. PATENT DOCUMENTS

| | | | |
|---|---|---|---|
| 788,136 | 4/1905 | Heilrath | 24/131 C |
| 2,289,710 | 7/1942 | Kelso | 24/131 C |
| 2,478,184 | 8/1949 | Elliott | 24/131 C |
| 3,555,625 | 1/1971 | Hoban | 24/131 C |
| 3,664,010 | 5/1972 | D'Agati | 24/131 C X |
| 3,724,034 | 4/1973 | Osano | 24/131 C |

Primary Examiner—Philip C. Kannan

[57] ABSTRACT

A fastener for rope and the like for locking into place any desired size loop or length in said rope. The fastener includes a continuous rod formed into a closed eye adjacent one end and a spiral formed of spaced coils adjacent the other end. Interposed between the spiral and the eye is a depression forming a shoulder. The rope extends from the eye through the spiral forming a loop of desired size and then is folded back around the outside of the coils over the shoulder and finally back down around the coils securely locking the loop in the rope.

3 Claims, 3 Drawing Figures

HELICAL COIL ROPE FASTENING DEVICE

This invention relates to a fastening device to be used in conjunction with ropes, cables or chains where a quick yet positive means of fastening is desirable. The principal object of the invention is to provide a fast, secure means of fastening a rope to an object so that the knot will not come loose or slip under strain. Another object of the invention is to provide a means of fastening, which, while secure, will not jam or bind itself even under severe strain. Still another object of the invention is to provide a means whereby a varying amount of slack or a varying size loop may be held securely without slipping or jamming up. Still another object of the invention is to provide an automatically adjustable length of line in a positive and secure means, that is without danger of unfastening. (Such as would be desired when a boat is moored and needs to rise and fall with the tide without becoming loose from its mooring.)

Representative embodiments of the invention are herein presented, but it will be appreciated that the invention is useful in numerous other means coming equally under the scope of the claims requested.

DESCRIPTION OF A PREFERRED EMBODIMENT

Figure 1:
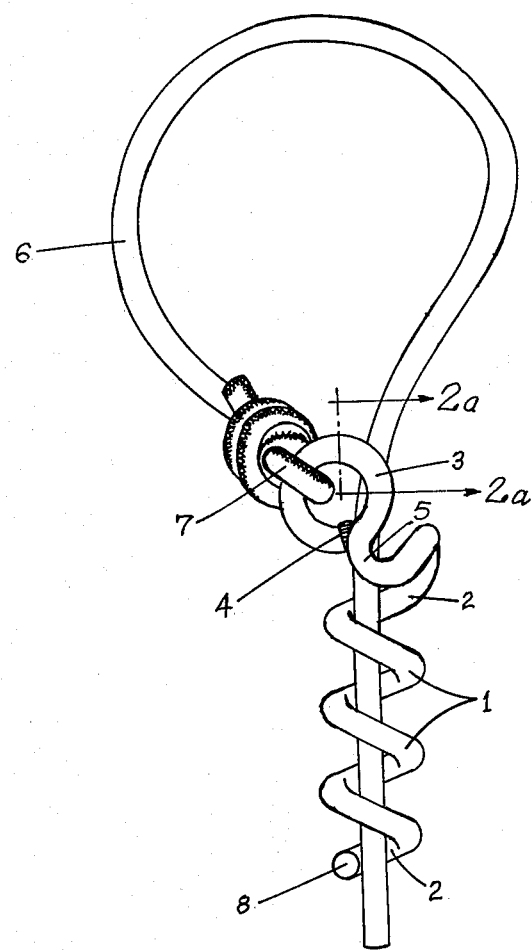
FIG. 1 is a side elevational view of a fastener constructed in accordance with the present invention.
Figure 2:
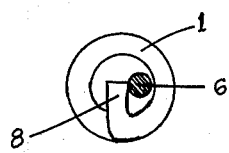
FIG. 2 is an end view taken from the bottom of the fastener shown in FIG. 1.
Figure 2A:
FIG. 2a is an enlarged sectional view taken along line 2a—2a of FIG. 1 showing a coating on the rod.

FIG. 1 is a side view showing the configuration of a fastener constructed in accordance with the present invention including a series of helical coils 1 formed in a steel shaft 2 which has a closed eye 3 positioned on one end that is welded to the shaft 2 at weld point 4. A depression or shoulder defining a notch 5 is provided in the shaft 2 between the coils 1 and the eye 3, the purpose of which will be explained in detail in the description of FIG. 3. One end of a rope 6 is attached by means of a knot 7 to the closed eye 3. The rope can be attached by means of splicing or knotting to the eye 3. The rope loop formed when the other end of the rope is fed through the coils as illustrated in FIG. 1, has an automatic choking characteristic when the loop is drawn tight and pulled back through the helical coils 1.

A right angle bend is provided in the end of coil 1 for preventing the accidental unwinding of the rope out of the helical coils.

Figure 3:
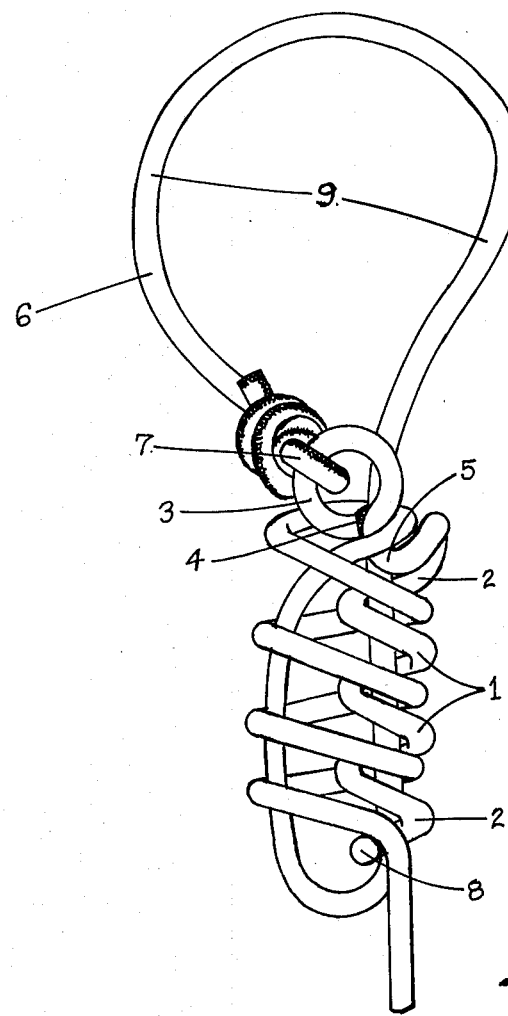
FIG. 3 is a side elevational view of a fastener illustrating the path that the rope takes in securing the loop. The path is expanded for purposes of clarity.

FIG. 3 is a perspective side view of the Yacht Knot with an expanded illustration of the way a rope would be wound onto the Yacht Knot in order to hold a certain length of loop, slack or standing line, in position. The shoulder depression (5) prevents rope from sliding around coils where it is overlapped on itself and wrapped through the coils a second time to positively lock the desired length into position. Again, the right angle turn (8) prevents any unwinding from coils.

The rod 2 may be constructed of any suitable form steel or other rigid material and, in the preferred embodiment, is coated with a nylon, vinyl or other resilient substance so as to prevent abrasion to the surface with which the fastener must come in contact and to prevent weather and wear damage to the fastener.

The bend 8 provided on the end of the coils takes the form of a 90° turn and prevents accidental unwinding of the rope from the helical coils.

While the helical coil fastener concept is not in and of itself novel, many of improvements incorporated in the Yacht Knot are novel. Therefore, what I claim as my invention is as follows.

I claim:

1. A fastener for rope and the like comprising:
   a plurality of aligned integrally joined coils extending around a common axis;
   one side of a depression forming shoulder integral with one end of said integral coils;
   a closed eye integral with the other side of said shoulder through which said rope is attached;
   said coils having a spacing therebetween for receiving said rope after said rope has been extended through said coils along said common axis back around the outside of said coils, over said shoulder, and finally consecutively wrapped through said aligned coils securely fastening said rope.

2. A fastener for rope and the like for locking into place any desired size loop or length in said rope, comprising:
   a continuous rod formed into
   (i) a closed eye adjacent one end through which an end of said rope is attached,
   (ii) a depression forming a shoulder having one side integral with said closed eye,
   (iii) a spiral formed of spaced coils having one end integral with the other side of said shoulder, and
   (iv) a right angle bend integral with the other end of said spiral;
   said rope extending from said eye through said spiral forming a loop of desired size between said eye and said spiral, said rope then extending back around the outside of said coils, over said shoulder, and finally around said coils securely fixing the size of said loop.

3. The fastener as set fourth in claim 2 further comprising:
   a non-abrasive coating provided on said continuous rod.

* * * * *